Oct. 28, 1952  Z. BLOCK ET AL  2,615,811
PROCESS OF INCREASING ADHESION OF COATINGS
TO DEEP-FAT FRIED FOODS
Filed March 28, 1950
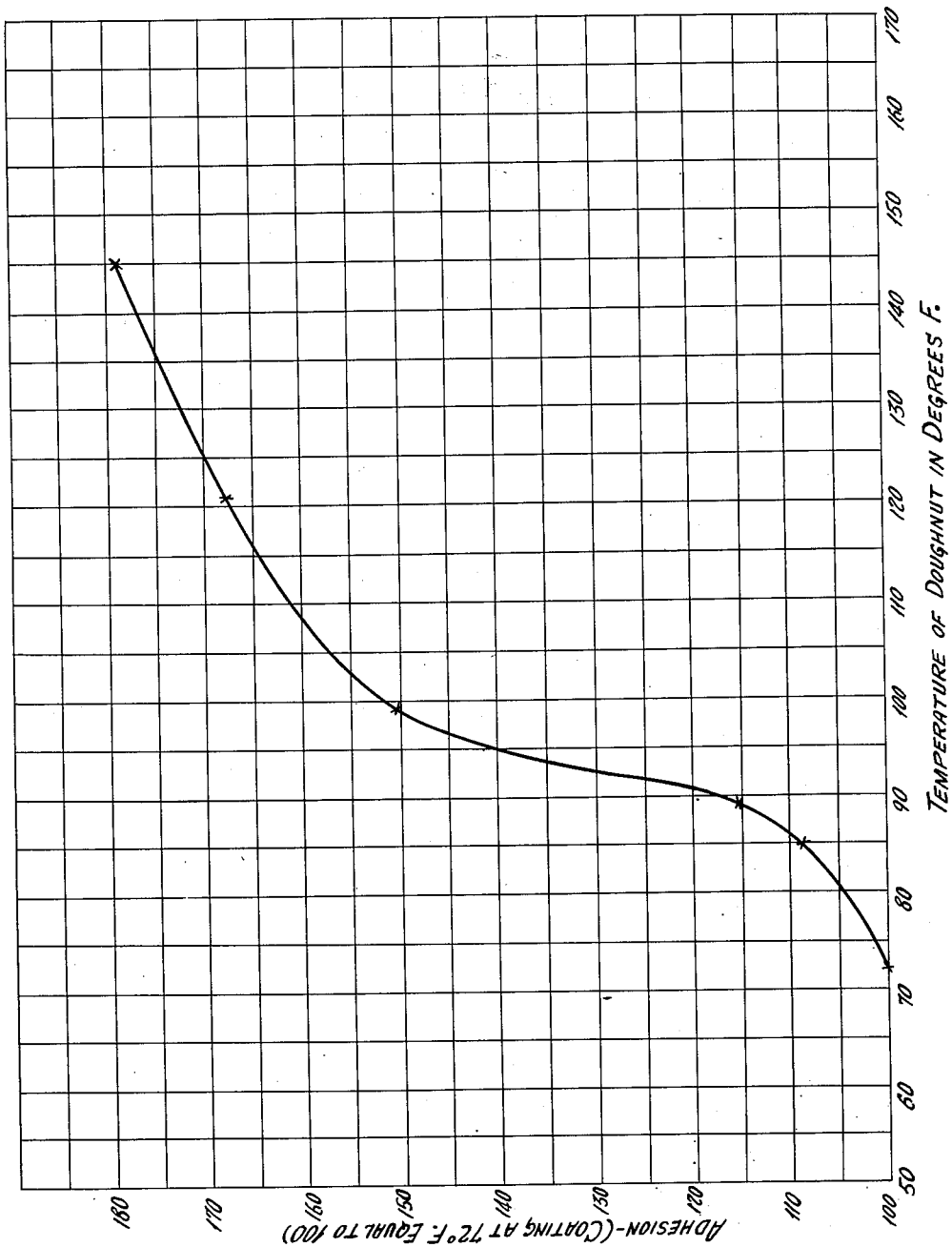
INVENTORS
ZENAS BLOCK
GEORGE J. ROSNER
BY ABRAHAM H. GOODMAN
Schaines & Lieberman
ATTORNEYS Patented Oct. 28, 1952

2,615,811

UNITED STATES PATENT OFFICE 2,615,811

PROCESS OF INCREASING ADHESION OF COATINGS TO DEEP-FAT FRIED FOODS

Zenas Block, Larchmont, George J. Rosner, Brooklyn, and Abraham H. Goodman, Great Neck, N. Y., assignors to Doughnut Corporation of America, New York, N. Y., a corporation of New York Application March 28, 1950, Serial No. 152,484

4 Claims. (Cl. 99—92)

The present invention relates generally to the coating of fried cakes, and will be described hereinafter in connection with the treatment of doughnuts, as one form of fried cake. In particular, the present invention relates to the coating of fried cakes, as doughnuts or the like with powdered sugar or similar material. The invention, while described in relation to the treatment of doughnuts, is to be limited only by the scope of the claims appended hereto, and may apply to the treatment of fried sticks, fried ball doughnuts and other types of fried cakes.

In coating fried cakes, as doughnuts and the like, with powdered sugar, it is highly desirable to achieve a uniform product; that is, an article on which the sugar is uniformly distributed over the entire surface area to a substantial extent. It is also highly desirable that the sugar adhere to the cake with stability and without becoming sticky and gummy. It is and has long been the usual practice in the industry to cool the doughnuts as they emerge from the hot frying solution to about 72° F. prior to sugaring same. This has been done, because, as the temperature in the fat fried doughnuts has been reduced, water is evaporated to the order of about 2%. However, when treated at this temperature, relatively little sugar will adhere to the doughnuts, although the sugar which does adhere is quite stable. The usual practice is to remove the freshly fried doughnuts from the deep hot fat and permit them to drain. Thereafter, the doughnuts, arranged upon suitable trays, are passed through a tunnel drier where they are exposed to circulated fresh air at normal room tempertaure of between 72° F. to 80° F. at normal relative humidity for a period of between 30 to 45 minutes. This results in the evaporation of water from the doughnuts, an amount sufficient to permit the application of powdered sugar thereto in a satisfactory state. The water lost by evaporation is of the order of approximately 2%. During this time, the temperature of the doughnuts drops to substantially that of the circulated air, that is, between 72° F. and 80° F. In the absence of the step of evaporating the water from the hot doughnuts with the consequent drop in temperature, the powdered sugar forms a sticky gummy coating upon the doughnut which is highly undesirable and unacceptable.

We have found that we can greatly increase the amount of sugar which will adhere to the doughnuts, if the temperature of the doughnuts is raised very substantially prior to sugaring, with the stability of the adherent sugar being of very satisfactory order. We have found also that the doughnuts will pick up greatly increased amounts of sugar if dusted with the powdered mixture before the temperature is reduced to the 72° F. which is standard in the industry.

With the method of our invention, the heated doughnuts may be cooled and water evaporated therefrom, as is the usual conventional practice, as aforesaid. Thereafter, however, we reheat the doughnuts to raise the temperatures thereof well over 72° F. and apply a coating of powdered sugar at substantially said elevated temperature. We have found that when the doughnuts are treated at temperatures above 85° F. and to 145° F., highly satisfactory results are obtained, with the greatest relative increase of adhesion of the powdered sugar to the doughnuts in the range between 85° F. and 105° F. At temperatures around 145° F., the amount of sugar which adheres to and is retained by the doughnuts is nearly twice that when the doughnuts are coated at the ordinary reduced temperatures.

Another manner of practicing the method of our invention is to heat the doughnuts with the powdered sugar after the fried cakes are removed from the frying vat and before the temperature thereof drops below 85° F.

In the following tabulation, the doughnuts were coated by enclosing twelve thereof at one time in a large paper bag containing the powdered sugar, and given fifty shakes. The powdered sugar was of a commercially available type. The temperature of the sugar was constant during all the tests, at about 72° F., but the temperature of the doughnuts was varied in each test, the several tests being arranged in the order of the degree of doughnut temperature. The doughnuts were weighed before and after the shakings.

| Temp. of Doughnut | Weight of Doz. Doughnuts | Weight of Powdered Sugar | Ozs. Coating Per Dozen Doughnuts | Percent Coating By Weight | Adhesion Rating. 72° F. Coating Equal to 100 on Scale |
|---|---|---|---|---|---|
| | Ounces | G. | | | |
| 145° F | 350 | 107 | 3.78 | 30.6 | 179.0 |
| 121° F | 349 | 100 | 3.53 | 28.7 | 168.0 |
| 99° F | 350 | 90 | 3.18 | 25.7 | 150.8 |
| 89° F | 345 | 68 | 2.40 | 19.7 | 115.2 |
| 85° F | 349 | 65 | 2.29 | 18.6 | 109 |
| 72° F | 334 | 57 | 2.01 | 17.05 | 100 |

The table above clearly proves the utility of our method for, at 72° F., the doughnuts picked up and retained a sugar coating of 17.05% by weight while at 145° F. the doughnuts picked up and retained a sugar coating of 30.6% by weight, or almost double the amount at the usual temperature. At 99° F. the coating of sugar was 25.7%, while at 121° F. the coating was 28.7% by weight.

In the drawing annexed hereto, the results of the tests above referred to are graphically illustrated, reflecting the sharpness of increase in adhesion between 85° F. and 105° F.

Having now described our invention, what we claim and desire to secure by Letters Patent is:

1. The method of treating hot fried cakes to cause powdered sugar to adhere thereto which comprises the steps of cooling same to about 72° F. while evaporating a small portion of the water content thereof, raising the temperature thereof to above 85° F., and thereafter coating same while substantially at said raised temperature with powdered sugar.

2. The method of coating hot fried cakes with powdered sugar which comprises the steps of cooling same to about 72° F., evaporating a small portion of the water content thereof, reheating same to raise the temperature thereof to between 85° F. and 145° F., and thereafter coating the reheated cakes while substantially at said raised temperature with powdered sugar.

3. The method of coating hot fried cakes with powdered sugar which comprises the steps of cooling same to about 72° F., evaporating a small portion of the water content thereof, reheating same to raise the temperature thereof to substantially 145° F., and thereafter coating the reheated cakes while substantially at a temperature of 145° F. with powdered sugar.

4. The method of treating hot fried cakes comprising the steps of evaporating water from the hot freshly fried cakes whereby the temperature thereof is reduced, reheating said cakes to raise the temperature thereof and thereafter applying a powdered sugar mixture to said cakes while at said elevated temperature.

ZENAS BLOCK.
GEORGE J. ROSNER.
ABRAHAM H. GOODMAN.

REFERENCES CITED

The following references are of record in the file of this patent:

Gillette: White House Cook Book, The Seafield Pub. Co., Akron, Ohio, 1926, pages 360, 361.